No. 792,140. PATENTED JUNE 13, 1905.
W. L. LANDON.
CORN COOKING AND MIXING MACHINE.
APPLICATION FILED MAY 3, 1904.
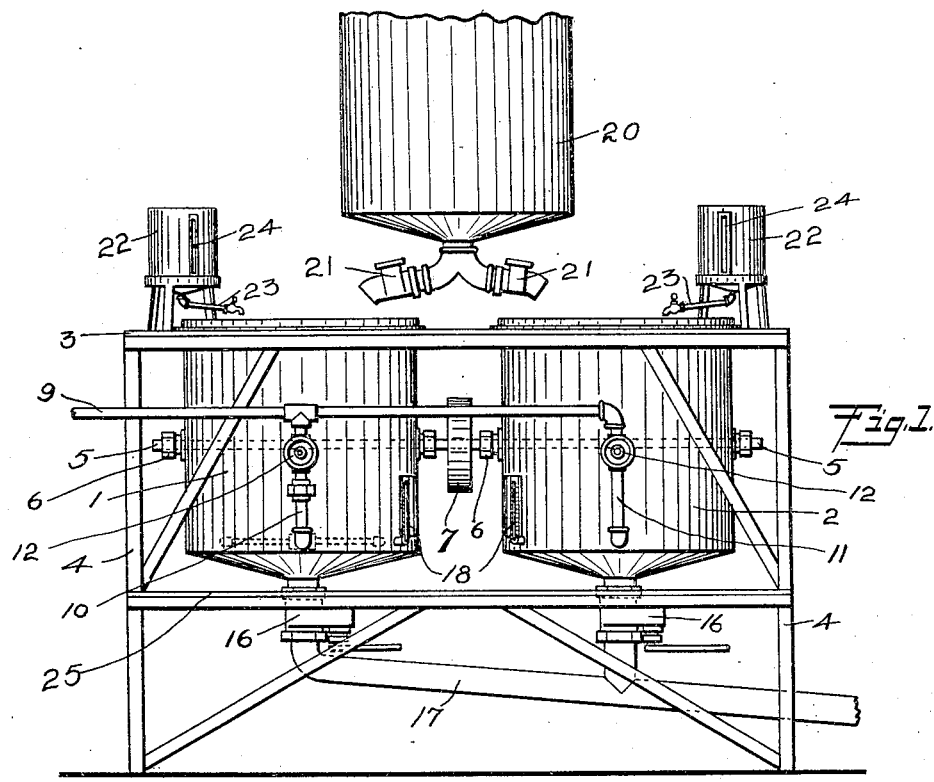
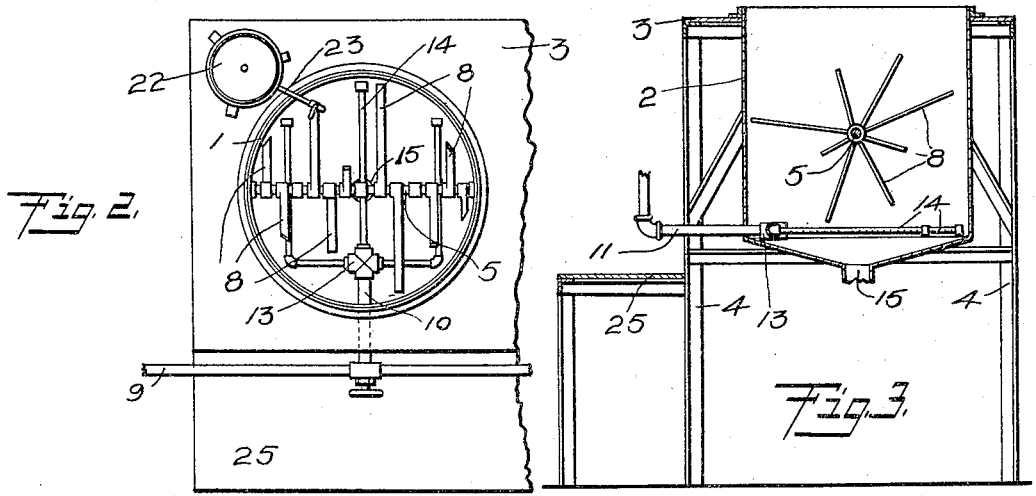
Witnesses
D. O. Barnell.
C. A. Smith.
Inventor
William L. Landon.
By Amasa J. Cargill
his Attorney No. 792,140.  Patented June 13, 1905.

UNITED STATES PATENT OFFICE.

WILLIAM L. LANDON, OF COUNCIL BLUFFS, IOWA.

CORN COOKING AND MIXING MACHINE.

SPECIFICATION forming part of Letters Patent No. 792,140, dated June 13, 1905.

Application filed May 3, 1904. Serial No. 206,236.

*To all whom it may concern:*

Be it known that I, WILLIAM L. LANDON, a citizen of the United States, residing at Council Bluffs, in the county of Pottawattamie and State of Iowa, have invented certain new and useful Improvements in Corn-Cooking and Mixing Machines; and I do hereby declare the following to be a full, clear, and exact description of the invention, such as will enable others skilled in the art to which it appertains to make and use the same.

My invention relates to corn mixing and cooking apparatus; and it is the object thereof to provide a device for cooking and preparing corn for canning purposes which shall be simple and economical in construction, which shall thoroughly and uniformly heat and mix the corn and other ingredients used therewith, and which shall be capable of delivering the heated and mixed ingredients to a can-filling machine without intermission.

My invention consists in the particular constructions, combinations, and arrangements of parts shown in the accompanying drawings and hereinafter described and claimed.

In the drawings, Figure 1 is a front elevation of a mechanism embodying my invention. Fig. 2 is a partial plan view of the same, and Fig. 3 is a transverse section through one of the cooking and mixing tanks.

In the construction shown, the cooking and mixing tanks 1 and 2 are held adjacent one another and supported in a hanging position from the platform 3 on the supporting angle-iron framework 4. Passing transversely through the tanks is a shaft 5, revoluble in suitable bearings on the sides of the tanks, all of said bearings being in alinement and provided with packing-glands 6, as shown, to prevent leakage of material from the tanks around the shaft. On the shaft at a position between the tanks is a pulley 7, by which the shaft may be driven. Secured to the shaft inside the tanks are a plurality of mixing-blades 8, the length of which varies, being shorter near the sides of the tanks and longer in the center, as shown. The pipe 9, which is connected with a suitable steam-supply, divides into two branches 10 and 11, on each of which is a cock 12 for controlling the flow of steam through the same. The steam-pipes 10 and 11 enter the tanks near the bottom thereof and are connected to cross connections 13, from which small branch pipes 14 extend outwardly and across the bottom of the tanks, as shown in Figs. 2 and 3. Said branch pipes are perforated on their under sides to permit the escape therefrom of steam. The bottoms of the tanks are inclined toward the central drain-openings 15, at which are the quick-opening valves 16, both of which connect with the inclined discharge-pipe 17, leading to a can-filling machine. Two or more of such discharge-pipes may be provided in case it is desired to supply more than one filling-machine from the same cooker and mixer. On each of the tanks is a thermometer 18 for observing the temperature of the contents thereof.

Supported in suitable manner above the mixing-tanks is a reserve-tank 20, preferably of about the capacity of one of the mixing-tanks. From the reserve-tank discharge-pipes lead to each of the mixing-tanks, said pipes being closed by cocks 21, as shown.

Supported on the platform 3 adjacent to the tops of the mixing-tanks are the small syrup-tanks 22, having cock-controlled outlet-pipes 23, discharging into the mixing-tanks and being provided with gage-glasses 24 to indicate the quantity of syrup therein.

The operation of the mechanism is as follows: The reserve-tank 20 is kept filled with corn which has been cleaned and prepared for the cooking operation. In the usual arrangement of a factory the cleaning and preparing of the corn is done on the floor above the cooking apparatus and the reserve-tank is suspended from said floor. Corn from the reserve-tank is admitted to one of the cooking and mixing tanks until the same is as full as desired. Power is applied to the pulley 7, causing the actuation of the shaft 5 and mixing-blades carried thereby. The cock 12 is opened, admitting steam to the perforated pipes 14, and the operator, standing on the handling-platform 25, observes the thermometer 18 on the side of the tank, so that when the mass has been heated to the desired temperature the steam may be shut off. When the cooking operation is complete, the valve 16 is opened and a sufficient quantity of the mass is discharged to fill the hopper of the can-filling machine. In the preparation of the corn for canning a certain quantity of syrup is added, the same being admitted, as desired, from the tank 22. While the cooked corn is being used from one of the tanks an additional quantity may be prepared in the other tank, so that the can-filler may be operated constantly.

In the preparation of corn for canning by the ordinary processes difficulty is encountered in securing uniformity in the semifluid mass, the solid particles of corn tending to settle to the bottom and the fluids to rise to the top of the mass. Difficulty is also experienced in securing a uniform temperature of the mass when admitted to the can-filler, the usual method being to admit fresh material continuously to the cooker and continuously draw away material therefrom, thus inevitably taking out some of the material which has not been thoroughly heated to the desired temperature. With my mechanism it is obvious that perfect uniformity may be secured both as to consistency and temperature, inasmuch as each tank is filled entirely with fresh material, the same heated throughout to the desired temperature before drawing out any of the same, and the mass constantly stirred from top to bottom by the mixing-blades, thus preserving a homogeneous consistency until the entire mass has been withdrawn from the tank and preventing the settling of solid particles.

Now, having described my invention, what I claim, and desire to secure by Letters Patent of the United States, is—

A corn mixing and cooking apparatus, comprising the combination with a supporting-framework, of two cooking and mixing tanks held adjacent to one another and supported in a hanging position from said platform, two bearings within each tank, all of said bearings being in alinement, a shaft revolubly held within said bearings, a pulley upon said shaft at a position between said tanks, a plurality of mixing-blades secured to said shaft inside of said tanks, the length of said blades varying, being shorter near the sides of the tanks and longer in the center, a steam-supply pipe divided into two branches, a controlling-cock upon each branch pipe, each tank being provided with one of said branch pipes entering the tank near the bottom thereof, branch pipes perforated on their under sides and extending outwardly and across the bottom of the tanks below said mixing-blades, the bottom within each tank being inclined toward a central drain-opening, a quick-opening valve extending from each drain-opening, and an inclined discharge-pipe connected to and common to both of said quick-opening valves, all arranged as shown.

In testimony whereof I hereunto affix my signature in presence of two witnesses.

WILLIAM L. LANDON.

Witnesses:
D. O. BORNELL,
M. C. FOX.